United States Patent [19]

Goldman

[11] Patent Number: 5,129,608
[45] Date of Patent: Jul. 14, 1992

[54] SNAP FIT CLAMP

[75] Inventor: Ross B. Goldman, Mountain View, Calif.

[73] Assignee: Raychem Corporation, Menlo Park, Calif.

[21] Appl. No.: 586,468

[22] Filed: Sep. 21, 1990

[51] Int. Cl.⁵ .............................................. F16L 3/00
[52] U.S. Cl. .................................................. 248/74.3
[58] Field of Search .................... 248/544, 74.1, 74.2, 248/74.3, 74.4, 74.5, 230; 24/543, 703.1

[56] References Cited

U.S. PATENT DOCUMENTS

| 2,359,209 | 9/1944 | Ellinwood | 248/74.3 |
| 2,421,443 | 6/1947 | Torresen | 248/74.3 |
| 3,445,898 | 5/1969 | Goodrich . | |
| 3,455,336 | 7/1969 | Ellis . | |
| 3,654,049 | 4/1972 | Ausnit . | |
| 3,765,329 | 10/1973 | Kirkpatrick . | |
| 3,910,448 | 10/1975 | Evans . | |

FOREIGN PATENT DOCUMENTS 507844  11/1954  Canada ................. 248/74.3

OTHER PUBLICATIONS

"Product Engineering", vol. 29, No. 27, 7/7/58, p. 9.

Primary Examiner—Robert W. Gibson, Jr.
Assistant Examiner—Robert A. Olson
Attorney, Agent, or Firm—Edith A. Rice; Herbert G. Burkard

[57] ABSTRACT

A wraparound clamping device for binding together a bundle of elongated parts, e.g. cables, which includes a band section formed substantially into a circle so that butt end surfaces of the band section are opposed to one another. A tongue is formed on one butt end surface and a groove is formed on the other butt end surface creating a strong snap fit. An end band extending tangentially from the circular band section near the butt end with the groove overlaps an end band extending from the other butt end. The circular band section forms a complete ring when the tongue is snapped into the groove. The bundle is enclosed within the circular band section. When the overlapping end bands are secured together and the circular band section is heat shrunk, the circular band tightens the bind around the bundle, the groove is squeeze onto the tongue so as to strengthen the joint of tongue and groove.

4 Claims, 6 Drawing Sheets

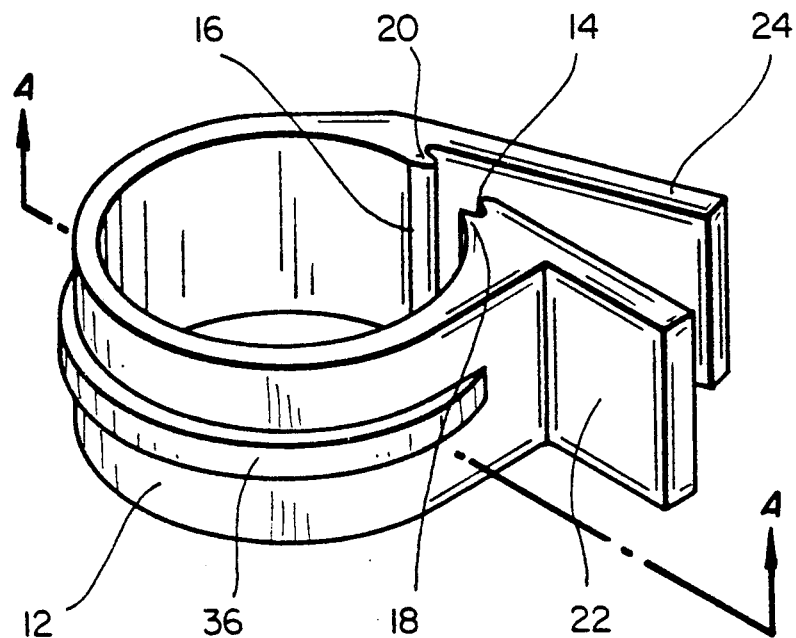
FIG_1
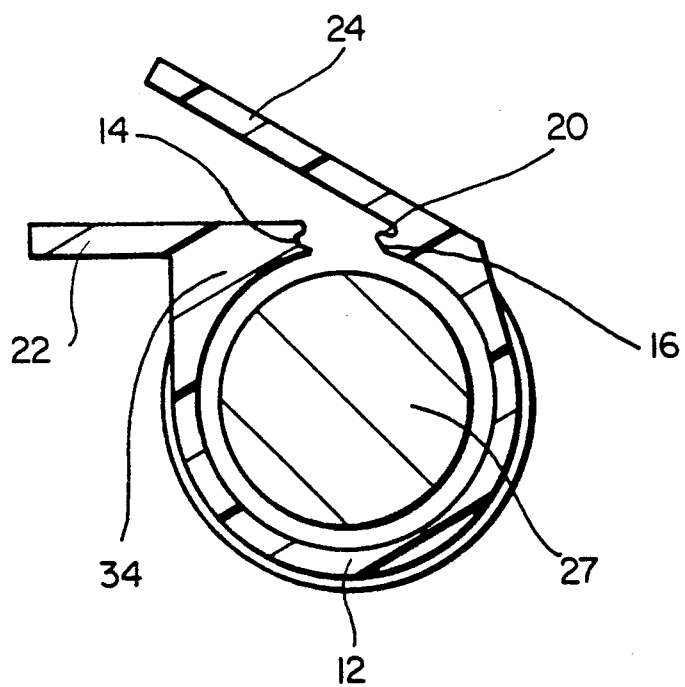
FIG_2

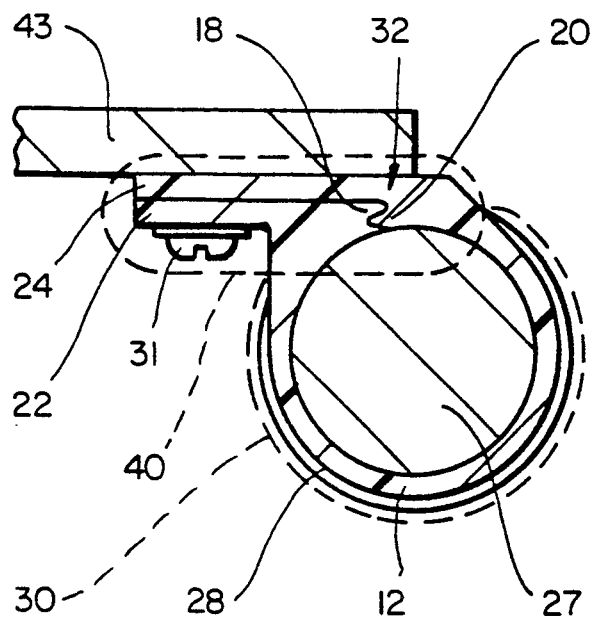
FIG_3
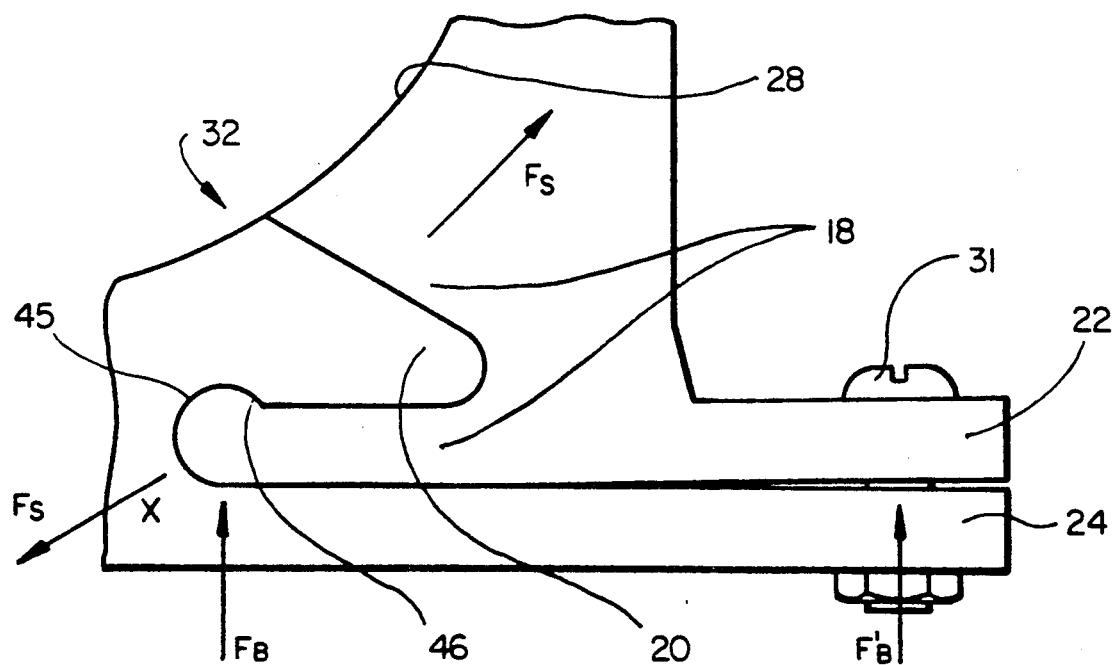
FIG_4

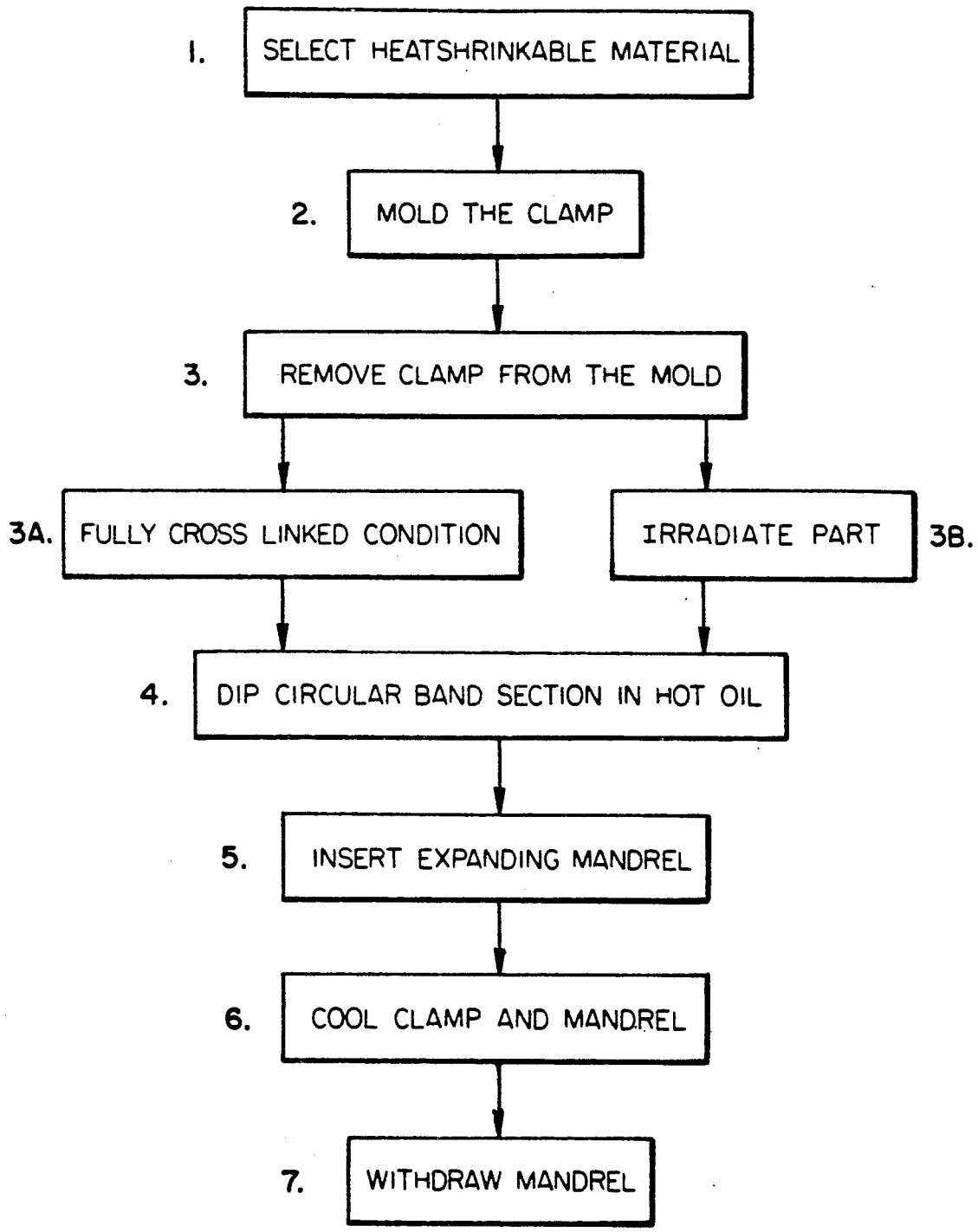
FIG_5

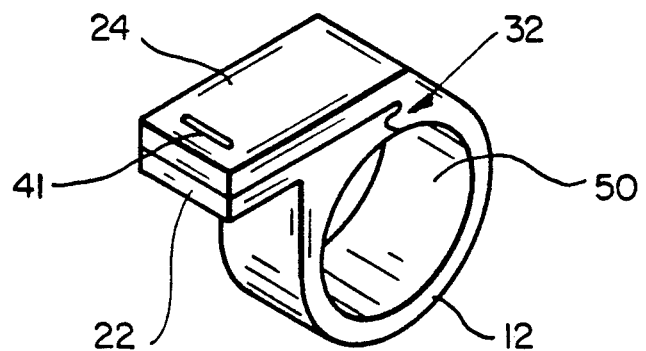
FIG_6A
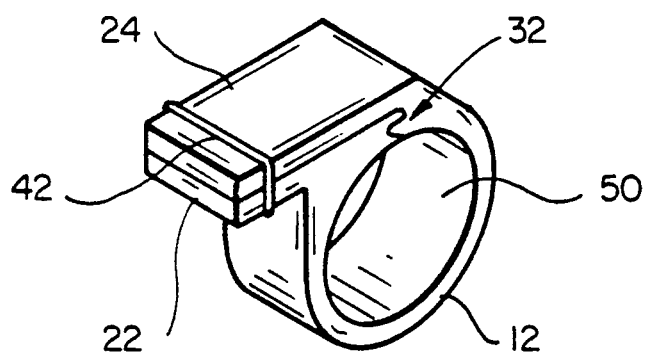
FIG_6B
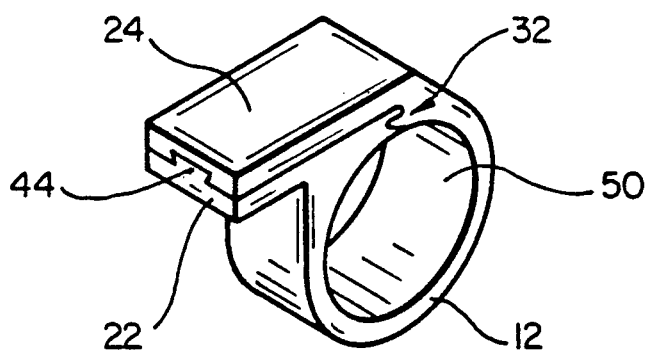
FIG_6C

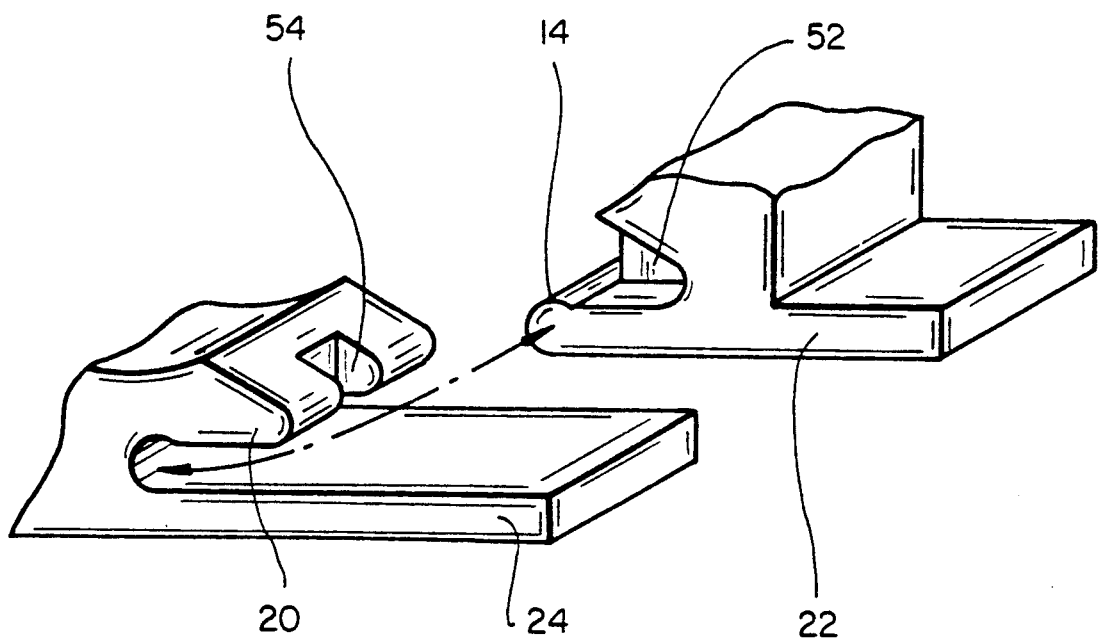
FIG_7A
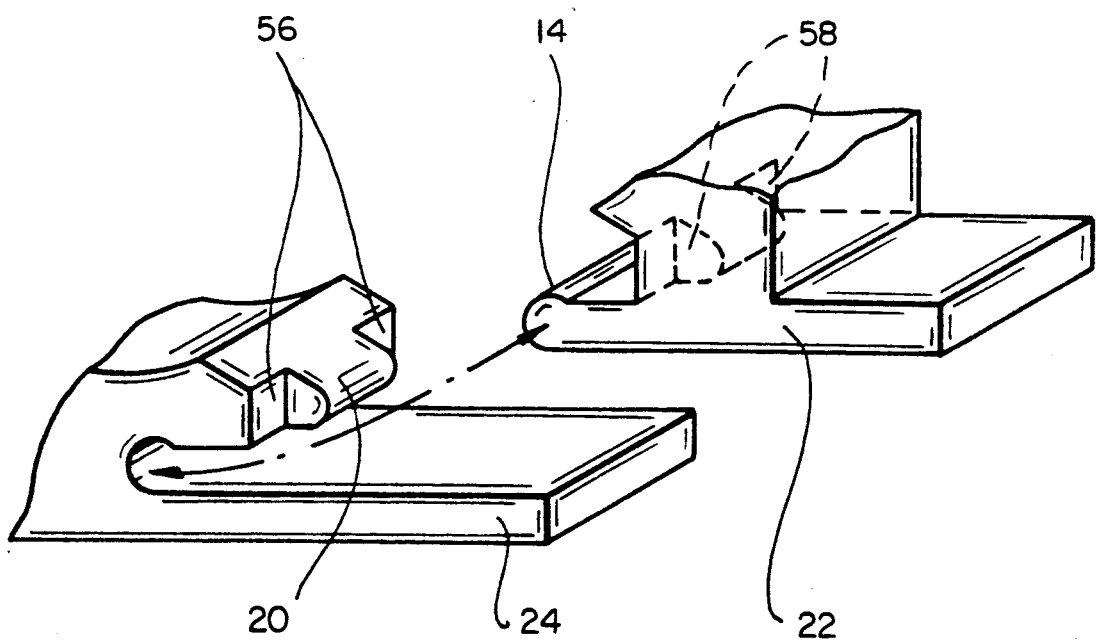
FIG_7B

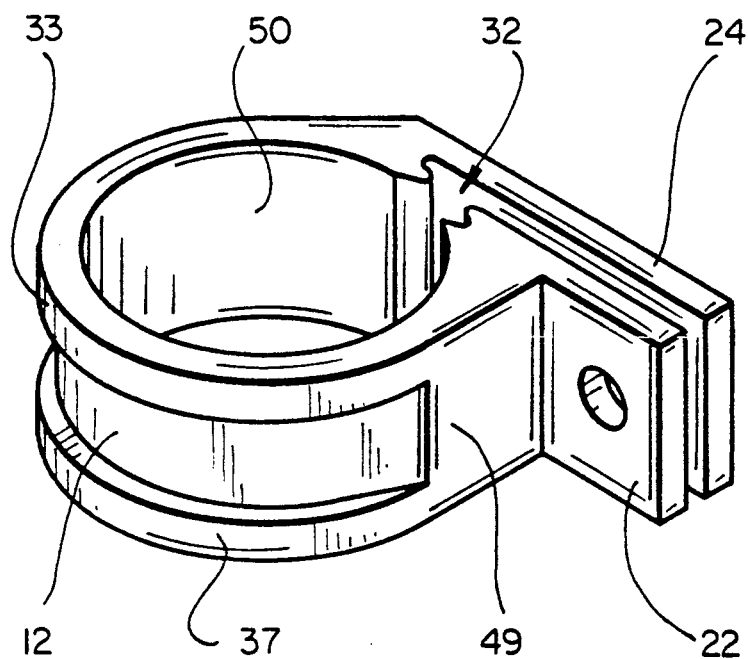
FIG_8
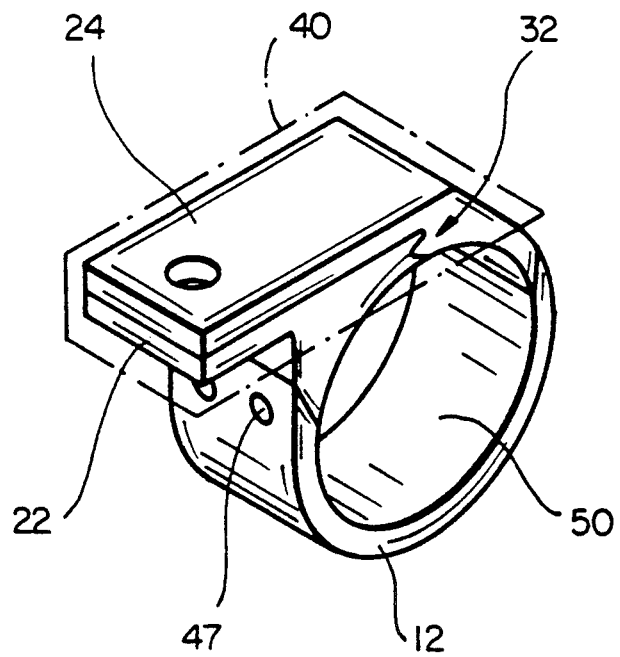
FIG_9

SNAP FIT CLAMP

FIELD OF THE INVENTION

This invention relates to heat shrinkable cable clamps and particularly to a cable clamp which, when wrapped around one or more elongated substrates such as cables, pipes or the like, has two ends that snap together and have extensions which may be bolted to a supporting surface.

BACKGROUND OF THE INVENTION

In the context of this application, having heatshrink properties is taken to mean a material having a transition temperature. Parts made of this material and heated above the transition temperature with no stress applied will assume dimensions that are stable above and below the transition temperature. The part is said to be "heat stabilized". Parts made of this material heated to above the transition temperature, may be stretched to new dimensions then cooled to below the transition temperature while maintained in the stretched condition. The part is said to be "heat recoverable". Then, when the part is reheated to a temperature above the transition temperature with no stress applied, the part will recover to or to its original dimensions. Such materials include polymeric materials which may be cross linked prior to being stretched at above the transition temperature.

Materials having heatshrink properties have played an important role in the development of clamping (or binding) devices used to bind bundles of elongated items, especially cables.

For example, U.S. Pat. No. 3,445,898 to Goodrich describes a heat shrinkable cable clamp comprising a band which wraps around a bundle of one or more cables so that the ends of the band may be bolted together. The band is then heated causing the band to shorten and thereby bind the bundle tightly together. Since a clamp of one size before heatshrink can be used to bind a bundle of cables whose size falls in a range of sizes, the number of clamps required to be kept in stock having various sizes is reduced. A bolt may also be used to fasten the bundle to a supporting surface.

Standard practice for manufacturing the Goodrich clamp begins by cutting a short length from a heat shrinkable polymeric tube. The short length is then collapsed to form a flat band comprising two polymeric strips secured together at each of their two ends. In order to reinforce the clamp near the bolted ends, a flat insert is positioned between the strips at each end and secured by localized heat shrink. The section of the band between the strips is curved into a loop so that one reinforced end of the band lies flat against the other providing that the two ends of the band may be bolted together.

Other inventions utilizing the heatshrink feature have been disclosed including elongated wraparound sleeves for elongated items. The purpose of the sleeves is different from the clamps which are intended to bind bundles of cables whereas the sleeves serve as an overall protective wrap. These patents are presented to further illustrate the uses and constructions as a wrap to which heat shrinkable materials have been applied.

For example, U.S. Pat. No. 4,378,393 to Smuckler discloses an elongated sleeve in which the edges of the sleeve overlap one another to form an elongated seam. Each of the interfacing surfaces that form the seam adjacent to each edge is coated with an adhesive. A tongue is formed along one edge which is engaged with a groove formed in the surface of the mating edge and thereby aligns the interfacing adhesive surfaces when the sleeve is wrapped around the item, prior to heat shrink.

The strength of the seam depends on several factors that are favorable for the application of the device as an elongated wrap. One is that the adhesive interface is subject to a shear stress as the sleeve shrinks with the application of heat rather than a tensile stress normal to the adhesive interface. (Adhesives are well known to possess good shear strength but relatively low peel strength.) The second important factor is that the area of the elongated interface is large which is not the case for the cable clamp comprising a narrow band. Of course, the construction shown in the Smuckler patent does not have an extension that could be bolted to a supporting surface as does the clamp described in the Goodrich patent so that the Smuckler device is useful simply as a protective wrap. Furthermore, it may be noted that the tongue and groove of the Smuckler construction is oriented so that stress in the plane of the adhesive interface generated by heat shrink pulls in a direction that would open the groove permitting the tongue to escape if the tension is great enough. Therefore, the major function of the tongue and groove in this construction is to align the interfacing adhesive coated surfaces rather than add appreciable strength to bonding the two edges of the sleeve. Additionally, the use of adhesive prevents reuseability and repairability. This is a problem when it is desired to unfasten the clamp temporarily for any one of several reasons and then to reapply the clamp.

U.S. Pat. No. 3,455,336 to Ellis discloses a heat shrinkable elongated sleeve in which each of the meeting edges is folded back to form upstanding rails. An elongated metal channel, in which the elongated edges of the channel are bent inwardly toward one another, forms an elongated clip which slides over the rails and secures the edges together.

U.S. Pat. No. 3,654,049 to Ausnit discloses an elongated wraparound heatshrinkable sleeve comprising a sheet in which two parallel elongated hooks are formed along each elongated edge of the sheet and hook onto the hooks of the other edge. A tool is required to fasten the two edges together.

Other patents which illustrate the use of tongue and groove to fasten two elongated edges together include U.S. Pat. No. 3,765,329 to Kirkpatrick which describes a heatshrinkable sleeve wrapped around a cylinder in which the cylinder has a groove formed therein to serve as an anchor for the edges of the sleeve and U.S. Pat. No. 3,910,448 to Evans et al which describes a construction of an enclosure (box) in which joints have a tongue and groove configuration.

The patents discussed in the foregoing paragraphs do not achieve the strength and integrity of closure that is required for many current applications of cable clamps.

For example, although the heat shrinkable clamp described in the Goodrich patent is an improvement over the clamps of bands not having the heatshrinking feature, there continued to be some problems that were not resolved by this early construction. One problem is that, as the clamp (band) tightens around the bundle, a triangularly shaped opening appears where the two ends of the clamp are bolted together, bounded by the bundle of cables and the interior surface of the clamp at the bound ends of the clamp. Therefore, the bundle is not clamped tightly in this region with the result that a cable can become loose. A second problem is that, as the cable clamp shrinks with the application of heat, tearing of the polymeric material may occur where it contacts the more rigid bent metal reinforcement.

Another problem is related to the necessity that, in order to provide an acceptable degree of heat shrinkage of the length of the band, the thickness of the band must be limited below a critical value. The thickness limitation places an upper limit on the achievable strength of the band.

While the Goodrich clamp generally functions entirely satisfactorily for some applications as a cable clamp, there are other situations in which a clamp having greater strength is required.

These and other problems with clamps of the prior art will be apparent to the reader which are resolved by the clamp of this invention.

THE INVENTION

Objects of the Invention

It is an object of this invention to provide a clamp comprising a band to bind a bundle of one or more or elongated items such as cables together.

It is another object that, in one embodiment of the invention, a section of the clamping band be heat recoverable so that a clamping band of one size can be used to clamp bundles having various sizes.

It is a further object that the section of the clamping band that is heat recoverable be reinforced by incorporating a novel geometrical shape that provides additional strength to this sections yet retain the heat recoverable property necessary to ensure a tight binding.

Still another object is that the clamping band, wrapped around a bundle, can have its ends secured to one another by any one or a combination of appropriate means such as a bolt, staple, etc. or a tongue and groove configuration in the surfaces forming the interface between the meeting ends of the band. In particular, the meeting ends would be fastened together by a bolt or tongue and groove when it is desired to be able to unfasten the clamp for whatever reason and then to reuse the clamp.

Another object is that the clamping band be attachable to a supporting surface and then heatshrunk in situ thereby providing convenience in assembling the bundle and securing it in its intended location.

Another object is that the cross sectional shape of the clamping band be such that strain in the section adjacent to the securing means introduced by pulling the ends of the band together be minimized in order to prevent breakage of the cable near the interface.

Another object is that the clamping band be maintained in tight contact with the bundle of cables around its entire periphery so that there is no way for any of the cables to become loose.

It is a further object to provide an economical method for manufacturing the clamp of this invention.

SUMMARY OF THE INVENTION

This invention is directed toward a cable clamp comprising several contiguous sections of band, to be wrapped around a bundle of cables and provides that the ends of the band may be secured together and to a supporting surface.

The clamp comprises a section of band formed substantially into a circle so that butt end surfaces of the band section face each other. A tongue formed in one butt end surface can be made to engage a groove in the opposing butt end surface to form a joint so that the circular band section forms a complete ring that encloses the bundle. A portion of the circular band between the butt end surfaces is heat recoverable.

A first end band is contiguous with the circular band section near one butt end surface and extends tangentially away from the circular band section. This first end band overlaps a second end band that is contiguous with the circular band section near the second butt end surface so that the two end bands may be secured together such as by bolting. Both end bands and portions of the circular band section near the butt ends are heat stabilized so that these portions including the tongue and groove will not be deformed when the circular band section is heat shrunk.

The tongue and groove are oriented with respect to the surface of the overlapping end band so that the groove tends to squeeze onto the tongue when the end bands are bolted together. This squeezing action strengthens the joint formed by the tongue and groove in contrast to constructions of the prior art in which tensile stress tends to open the groove permitting the tongue to escape.

A bulb on a lip of the groove and mating recess in the tongue also strengthens the joint.

The thickness of the end bands may be greater than the circular band because the circular band must be flexible and heat shrinkable. In order to maintain sufficient strength in the circular band in spite of the reduced thickness, the circular band has one or more ribs that are formed on the outside surface of the band concentric with the circular band.

The tongue in groove and ribbed construction prevent the clamp of this invention from being manufactured by the conventional extrusion technique used to make clamps of the prior art. Therefore an apparatus and method of manufacture is provided which is an additional embodiment of this invention. The apparatus includes a mold having removable inserts to form the ribs in the molded clamp. The method includes joining the tongue and groove of the molded clamp then dipping a portion of the circular ring of the molded clamp in oil at a temperature above the transition temperature. An expansion mandrel is inserted into the circular band to stretch the circular band. Then the clamp with mandrel is removed from the oil and allowed to cool. The mandrel is then withdrawn leaving a portion of the circular band in a heat recoverable condition and the remaining portion of the clamp in a heat stabilized condition.

BRIEF DESCRIPTION OF THE DRAWINGS

FIG. 1 shows a perspective view of the open cable clamp.

FIG. 2 shows a cross sectional view of the cable clamp shown in FIG. 1 taken along line of sight AA.

FIG. 3 shows the sectional view of FIG. 2 with the clamp closed and after heatshrinking.

FIG. 4 is a force diagram of the forces exerted by the strain in the clamp and the bolt on the tongue and groove.

FIG. 5 is a flow chart illustrating the method of manufacturing the clamp.

FIG. 6a, 6b and 6c show the use of a staple, clip or second tongue and groove to bind the end sections together.

FIG. 7a shows a notch in the tongue and a catch in the groove which prevents sidewise sliding of the butt ends of the central band section.

FIG. 7b shows a pair of notches on the tongue which mate with a pair of catches in the groove to prevent sidewise sliding of the butt ends of the central band section.

FIG. 8 shows a rib on each outside edge of the circular band section.

FIG. 9 shows the central band section substantially comprising an elastomeric band riveted to the butt end portion.

DETAILED DESCRIPTION OF THE PREFERRED EMBODIMENTS

The following detailed description illustrates the invention by way of example and not by way of limitation of the principles of the invention. This description will clearly enable one skilled in the art to make and use the invention and describes several embodiments, adaptations, variations and uses including what I presently believe to be the best mode of carrying out the invention.

Turning now to a detailed description of the drawings, there is shown in FIG. 1 a perspective view of the cable clamp of this invention with the clamp open. FIG. 2 is a sectional view of the cable clamp shown in FIG. 1 taken along line of sight AA. There is shown a substantially circular band section 12 having a first and second butt end surfaces 14 and 16 opposed to one another. A groove 18 is formed in the first butt end surface 14 and a tongue 20 is formed in the second butt end surface 16. As shown in FIG. 3, the tongue and groove snap together to form a joint when the butt end surfaces of the circular band are brought together so that the circular band section becomes a closed ring. A first end band 22, contiguous with the circular band near the first butt end surface 14, extends tangentially away from the circular band section 12. A second end band 24, contiguous with the circular band section 12 near the second butt end surface 16, extends tangentially away from the circular band section. The second end band 24 overlaps the first end band 22 so that when the tongue 20 is engaged with the groove 18, broadsides 26 of the end bands are substantially opposed to one another as shown in FIG. 3.

In one embodiment, the entire clamp is molded from heat stabilized material. This embodiment is useful where strength of the joint is the primary consideration and the heatshrink feature is subordinate to the need to make the clamp from the strongest possible material.

In another embodiment, shown in FIG. 9, the end bands 22 and 24 and a portion of the circular band (all shown within the discontinued line enclosure 40) are heat stabilized while a substantial remaining portion of the circular band section 50 not including the tongue and groove is composed of elastomeric material. In this case, the elastomeric section may be joined to the heat recovered section by mechanical means such as a rivets 47 or by heat bonding.

In another embodiment and referring to FIG. 3, the end bands 22 and 24 and a portion of the circular band (all shown within the discontinued line enclosure 40) are heat stabilized while a substantial remaining portion of the circular band section not including the tongue and groove is heat recoverable. With a bundle 27 of elongated items enclosed within the circular band, end bands secured to one another and tongue engaged with the groove, the heat recoverable portion of the circular band section is heated to a temperature above the transition temperature causing the circular band to contract and firmly secure the enclosed bundle. Contraction of the circular band section to conform to the boundary 28 of the bundle 27 is represented in FIG. 3 which shows the initial shape (dashed line 30) and the final shape 12 of the circular band conforming to the bundle 26. FIG. 3 also shows that there are no openings between the inside of the circular band section and the boundary of the bundle which would otherwise lead to loose cables as in the case of the clamps of the prior art.

The bolt 31 bolts the end bands together and secures the clamp to support surface 43.

The feature of this invention according to which the material forming the end bands and tongue and groove joint is heat stabilized and the circular band section is heat recoverable in done in order to maintain the integrity of the tongue and groove and the means of securing the end bands during the final heat shrinking step of the circular band section after the clamp is bolted around the bundle.

As shown in FIG. 4, an important feature of this invention is the construction of the tongue and groove which is oriented so that the resultant force, Fb bolt 31 squeezing the end sections together with force Fb' leveraged about point x, cause the groove to pinch down on the tongue against the bundle boundary and thereby increase the strength of the joint 32 between the two butt end surfaces and to prevent release of the snap fit. The leveraged force of the bolt is represented by the arrows Fb and Fb' in FIG. 4.

Strength of the joint is also increased by a bulb 45 on a lip of the groove and mating recess on the tongue which transfers the hoop stresses, Fs across the separation line 46.

For some applications, a construction is required that prevents the tongue from sliding sidewise out of the groove in a direction parallel to the axis of the central band. One of several modifications can be introduced to prevent this as illustrated in FIG. 7 a, b. FIG. 7a shows a catch 52 in the groove that will mate with a notch 54 in the tongue to prevent sidewise slipping when tongue and groove are engaged. FIG. 7b shows two notches 56 on the tongue, each paired with a catch 58 on the groove at each out side edge of the band. (The far side catch is shown in in phantom in FIG. 7b).

The thickness of the central section is a compromise between the need to have the central section thick enough to present adequate strength and thin enough to provide efficient heating during the heat shrink operation. It is a feature of this invention that one or more circumferential ribs (36 in FIG. 1) are formed on the outside surface of the circular band which increase the tensile strength of the circular band without appreciably reducing percent heat shrink capability and flexibility. The "I" beam principle is invoked according to which the flexural rigidity added by the rib is proportional to $d \times D(\exp 3)$ where d is the width perpendicular to the direction of bending and D is the height of the rib and is parallel to the radial force generated by squeezing the bundle.

As shown in FIG. 8, a particularly advantageous arrangement of reinforcing ribs is to provide two ribs, 33 and 37, one around each outside edge of the central band. An advantage of this construction is that the central band will not have a tendency to warp (bow across its width) as occurs to some extent when bands are more centrally located between the outside edges. The reinforcing ribs are shown in FIG. 8 to meet the end band perpendicularly at location 49 in order to provide greater strength to the clamp. Greater strength is required at this location particularly when the clamp is subject to vibration.

Other variations in the construction of the clamp include the use of a staple 41, clip 42 or tongue and groove 44 in place of the bolt as shown in FIG. 6a, 6b and 6c respectively.

The cable clamp of this invention cannot be made by practices used in making clamps of the prior art because of the features of this invention. The ribbed construction cannot be incorporated into the clamps of the prior art because clamps of the prior art are made from tubes extruded in a direction that would be perpendicular to the ribs.

The configuration of the clamp described in the foregoing paragraphs and composed of heat recoverable material in the circular band and heat stabilized material in the end bands requires a novel method of manufacture that does not include extrusion. The method of manufacture involves the use of a mold having inserts specially designed to correspond to the reentrant surfaces associated with the ribs, notches, catches, etc.

Accordingly, an apparatus and method of manufacturing these clamps have been developed which is a feature of this invention. The method is illustrated by the flow chart of FIG. 5.

In step 1 a material is selected that has heat shrink properties (where "heat shrink properties" is used in the context defined in the Background). The material can be selected from a wide range of materials but for many applications should have a secant modulus greater than 25,000 psi.

In step 2, a part is formed in the mold having the clamp construction discussed in the foregoing paragraphs. In step 3, the molded part is removed from the mold At this point, step 3A, the part may be in a fully heat stabilized condition (i.e., non heatshrinkable) in which case, the process proceeds to step 4. However in some instances, depending on the choice of material, further cross linking is required. This is accomplished by irradiating the part with an electron beam (step 3B).

In step 4, a substantial portion of the circular band not including the butt end surfaces is heated above the transition temperature of the heat recoverable temperature. the clamp to be heat recoverable in oil heated to the required temperature.

In step 5, a mandrel is inserted into the interior of the circular band to expand the circular band.

In step 6, the part with mandrel enclosed is withdrawn from the oil and allowed to cool to below the transition temperature. In step 7 the mandrel is withdrawn.

In the foregoing paragraphs, a cable clamp has been described which meets the objects of the invention. The cable clamp has a circular band section that is heat shrinkable and provided with reinforcing ribs to increase tensile strength of this section. The overlapping end bands of the clamp and butt end surfaces of the circular band section can be secured by a tongue and groove in combination with a bolt to hold the clamp together around a cable bundle as the circular band section is heat shrunk. The design of the end bands together with the tongue and groove prevents any separation of the end bands interfacing one another that would otherwise leave an opening where a cable could be loosened from the bundle. Catches and notches in groove and tongue respectively can be formed to prevent sideways slipping. The clamp could be used to secure bundles of elongated objects other than cables such as bars, pipe, tubes, etc. Ribs around the central band section increase strength of the clamp without appreciably diminishing heat shrink characteristics.

It should be understood that various other modifications within the scope of this invention can be made by one of ordinary skill in the art without departing from the spirit thereof.

What is claimed is:

1. A clamping device for wrapping around one or more elongated substrates comprising:
    a band section having a first and a second butt end surface and formed substantially into an incomplete circle with said butt end surfaces opposing each other;
    a groove in said first butt end surface;
    a tongue in said second butt end surface positioned for engagement with said groove thereby forming a joint and providing that said circular band section be a complete ring;
    a first end band contiguous with and extending tangentially away from said from said circular band section near said first butt end;
    a second end band contiguous with and extending tangentially away from said circular band section near said second butt end; and
    said second end band overlapping said first end band when said tongue is engaged with said groove permitting said end bands to be secured together and to enclose said substrate within said circular band section, wherein said grooved butt end surface has a bulb and said tongue has a recess interfacing said bulb when said tongue and groove are engaged thereby strengthening said joint.

2. A clamping device as in claim 1 wherein a substantial portion of said circular band section between said butt end surfaces is composed of material which is heat recoverable thereby enabling said circular band to shrink when heated and secure said substrate.

3. A clamping device as in claim 2 wherein said end bands and a portion of said circular band section including said butt end surfaces are heat stabilized.

4. A clamping device as in claim 1 wherein said substrate of elongated items has an outer boundary opposed to an inner boundary surface of said circular band section and said clamp further comprises means for forcibly securing said first and second end bands together thereby squeezing said grooved butt end between said first end band and said boundary and strengthening said joint.

* * * * *